United States Patent
Gandhi et al.

(10) Patent No.: US 8,194,562 B1
(45) Date of Patent: * Jun. 5, 2012

(54) METHOD AND SYSTEM FOR MANAGEMENT OF RF ACCESS PROBES BASED ON RF CONDITIONS

(75) Inventors: Meghna N. Gandhi, Overland Park, KS (US); Hector M. Ribas, Overland Park, KS (US); E. Michael Shafer, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/605,685

(22) Filed: Oct. 26, 2009

Related U.S. Application Data (63) Continuation of application No. 11/073,556, filed on Mar. 7, 2005, now Pat. No. 7,636,322.

(51) Int. Cl.
   *H04L 12/26* (2006.01)
(52) U.S. Cl. ....... 370/252; 370/329; 370/342; 455/63.1; 455/67.11; 455/522
(58) Field of Classification Search ........................ None
   See application file for complete search history.

(56) References Cited

U.S. PATENT DOCUMENTS

| | | | |
|---|---|---|---|
| 6,002,664 A * | 12/1999 | Schachter | 370/207 |
| 6,845,245 B2 * | 1/2005 | Hunzinger | 455/510 |
| 6,968,201 B1 * | 11/2005 | Gandhi et al. | 455/522 |
| 7,010,329 B2 * | 3/2006 | Livet et al. | 455/574 |
| 7,024,217 B2 * | 4/2006 | Hunzinger | 455/510 |
| 7,215,653 B2 * | 5/2007 | Kim et al. | 370/329 |
| 7,221,653 B2 * | 5/2007 | Vanghi | 370/252 |
| 7,228,134 B2 * | 6/2007 | Gandhi et al. | 455/434 |
| 7,356,346 B2 * | 4/2008 | Gopalakrishnan et al. | 455/512 |
| 7,466,682 B1 * | 12/2008 | Ribas et al. | 370/342 |
| 7,636,322 B1 * | 12/2009 | Gandhi et al. | 370/252 |
| 7,668,561 B2 * | 2/2010 | Au et al. | 455/522 |

* cited by examiner

*Primary Examiner* — Michael J Moore, Jr.

(57) ABSTRACT

A method and system for dynamically optimizing access channel parameters in a cellular wireless communication system. A computer system monitors the level of access channel occupancy and the level of reverse link noise in a given cell sector, and the computer system then automatically adjusts access channel parameters for the sector if the access channel occupancy and reverse link noise cooperatively meet certain threshold criteria. Ideally, the adjustments in access channel parameters will help to improve the success of access channel communications. The computer system may be integrated as part of a base station or may be provided as a separate entity.

20 Claims, 6 Drawing Sheets

| TIME SLOT TS1 | TIME SLOT TS2 | TIME SLOT TS3 | TIME SLOT TS4 | TIME SLOT TS5 | TIME SLOT TS6 | TIME SLOT TS7 |
|---|---|---|---|---|---|---|
| AP 1<br>AP 2 | AP 3 | AP 4<br>AP 5<br>AP 6 | AP 7 | AP 8<br>AP 9 | | AP 10 |

METHOD AND SYSTEM FOR MANAGEMENT OF RF ACCESS PROBES BASED ON RF CONDITIONS

REFERENCE TO RELATED APPLICATION

This is a continuation of U.S. patent application Ser. No. 11/073,556, filed Mar. 7, 2005 (and now issued as U.S. Pat. No. 7,636,322), the entirety of which is hereby incorporated by reference.

FIELD OF THE INVENTION

The present invention relates to cellular wireless telecommunications and, more particularly, to management of radio frequency (RF) access probes.

BACKGROUND

In a cellular wireless communication system, an area is divided into cells and cell sectors, each defined by a radiation pattern (on a particular frequency) from a respective base transceiver station (BTS). Each BTS is then typically connected with a base station controller (BSC), which, together with the BTS defines a "base station." Further, the BSC may then be connected with a switch or gateway that provides connectivity with a transport network such as the public switched telephone network (PSTN) or the Internet. Conveniently with this arrangement, a cell phone or other wireless communication device (generally "mobile station") that is positioned within the coverage area of a given sector can communicate over an air interface with the BTS and in turn via the BSC and switch or gateway with entities on the transport network.

Unlike landline telephones that exist at known, fixed locations, mobile stations can operate at virtually any location where a wireless carrier provides coverage. Consequently, in order for a mobile station to be able to engage in useful communications (voice or data) in the cellular wireless communication system, the mobile station must first register with the system, so that the system knows where the mobile station is located (e.g., for purposes of directing calls to the mobile station) and so that the system can verify that the mobile station is authorized to be operating in the system.

The manner in which a mobile station registers with a cellular wireless communication system can take various forms, depending on factors such as the configuration of the system and on the communication protocols used. In a system operating according to the well known CDMA2000 protocol, for instance, a mobile station registers by sending over the air to the base station an "access probe," which carries an identifier of the mobile station and perhaps other pertinent information. The mobile station sends the access probe in a "slotted aloha process" in which it repeatedly sends the access probe at increasingly higher power levels until it receives an acknowledgement message from the base station, or until it otherwise exhausts the process (e.g., the maximum transmission power of the mobile station is reached and no acknowledgment has been received). The mobile station may repeat a slotted aloha sequence a number of times, until concluding that an access failure has occurred. Each access probe travels in a timeslot of an air interface access channel to the base station, and an acknowledgement travels in a timeslot of an air interface paging channel from the base station.

In a given sector, the slotted aloha process proceeds according to operational parameters that are broadcast in a "system parameters message" on the paging channel to mobile stations operating in the sector. Under CDMA2000, for instance, the operational parameters include:

(1) INIT POWER. The power at which the mobile station should transmit its initial access probe in a slotted aloha sequence.

(2) POWER STEP. The extent to which the mobile station should increase transmit power for each successive access probe in the slotted aloha sequence.

(3) NUMBER OF PROBES. The number of access probes per slotted aloha sequence, e.g., after the first access probe.

(4) MAX NUMBER OF REQUEST SEQUENCES. The maximum number of slotted aloha sequences the mobile station should apply when placing a call (i.e., before concluding that the attempt to place the call failed).

(5) MAX NUMBER OF RESPONSE SEQUENCES. The maximum number of slotted aloha sequences the mobile station should apply when receiving a call (i.e., before concluding the that the attempt to receive the call failed).

(6) PROBE PN RAN. A value that is used to reduce access probe collisions when multiple mobile stations might simultaneously send access probes. A mobile station selects an integer number from (i) 0 to (ii) 2 to the power of PROBE PN RAN, by applying a hash function keyed to the mobile station's unique electronic serial number (ESN). When a user presses the "TALK" key on the mobile station to place or receive a call, the mobile station then waits that integer number of chips (each 26.67 milliseconds) before sending its first access probe. Consequently, when users seek to establish calls at the same moment, the PROBE PN RAN value would work to spread apart the times when the mobile stations send their access probes.

When the base station receives an access probe from a mobile station, the base station then passes the access probe along to the switch (mobile switching center (MSC)) or other entity, which then responsively sends a registration notification message to the mobile station's home location register (HLR). The HLR then updates the mobile station's profile to indicate where the mobile station is operating (e.g., which switch is serving the mobile station) and may further carry out an authentication process, and then sends a registration response, which propagates to the mobile station.

Various trigger events can cause mobile stations to register with the system. In a CDMA2000 system, for instance, a mobile station will generally register (i) whenever it enters a new zone, as indicated by a distinct "reg zone" parameter the mobile station receives in an air interface control channel message from the base station, (ii) on a periodic basis, with a period indicated by a "reg_period" parameter that the mobile station receives in an air interface control channel message from the base station, (iii) when the mobile station places a call, as a prerequisite to call placement, and (iv) when the mobile station responds to a page message indicative of an incoming call.

In some situations, the air interface (e.g., a particular sector defined by a base station) can become overwhelmed with too much use. This can happen, by way of example, if too many mobile station registrations occur at once. In a CDMA2000 system, for instance, if access probes from two or more mobile stations line up (by chance) in the same timeslot of the access channel, an "access probe collision" occurs. The result of such a collision is that none of the probes will succeed, principally because the base station will not receive any of the probes in a comprehensible form due to interference between the probes. Thus, each mobile station would have to re-send its access probe, because it would not receive an acknowledgement from the base station.

In many situations, access probe collisions are not very likely to occur, because sufficient timeslots exist on the access channel. However, in situations where many users are placing calls at once, the number of access probes and access probe collisions can increase exponentially (or at least greatly). For example, after a football game or in an emergency situation, many people within a given sector may use their mobile phones to place calls (e.g., to call 911, to call friends and family, to check voice mail, or for other purposes). Each time a mobile station goes to place a call, as noted above, the mobile station would send an access probe. Consequently, in a situation where many people within a given sector place calls at once, many access probes will be sent at once. In turn, access probe collisions would occur, and so still more (re-try) access probes will be sent. Further, as this is occurring, mobile stations will be periodically registering with the system, according to the "reg_period" directive from the base station, which will still further increase the frequency of access probe collisions.

Unfortunately, as the access channel becomes more and more occupied with access probes, two undesired effects will tend to occur. First, the number of access probe collisions will tend to increase, which means that registrations will take longer to successfully complete. In placing and receiving calls, this longer registration process translates into longer call setup time, which in turn translates into an unacceptable user experience. Second, as mobile stations exhaust the slotted aloha process, the number of ultimate access failures will tend to increase. In placing and receiving calls, these access failures will be perceived as blocked calls, which will also result in unacceptable user experience. Therefore, an improvement is desired.

SUMMARY

The present invention is directed to a method and system for dynamically optimizing access channel parameters in order to reduce the likelihood that the foregoing problems will occur. The invention stems in part from a realization that two main factors contribute to the need for repeated re-transmissions of access probes and, ultimately, to the occurrence of access failures. First, if there is too much noise on the air interface, or if access probes are sent at too low of a power level, then the access probes may not successfully reach the base station. Second, if there are too many access probes at once, the likelihood of access probe collisions will increase.

According to the invention, a computer system will monitor the level of access channel occupancy and the level of reverse link noise and will automatically adjust access channel parameters when certain threshold conditions are met, in an effort to improve the success of access channel communications. The computer system may be integrated as part of the base station or other radio network element (and may in fact be the base station or other element itself), or it may sit as a separate system that monitors system performance and makes adjustments (or provides outputs to trigger adjustments) accordingly.

These as well as other aspects of the invention will become apparent to those of ordinary skill in the art by reading the following detailed description with reference where appropriate to the accompanying drawings. Further, it should be understood that this summary, as well as other descriptions herein, are intended to illustrate the invention by way of example only and are not intended to limit the scope of the invention as claimed.

DETAILED DESCRIPTION

While embodiments of the invention are discussed generally in the context of CDMA wireless communication systems, it will be appreciated that the invention is not limited in this respect and that embodiments of the invention may be implemented in any number of types of wireless communication systems, such as time division multiple access (TDMA) systems and global system for mobile communications (GSM) systems, for example. As in most telecommunication and data applications, it will also be appreciated that many of the elements of the various embodiments described herein are functional entities that may be implemented as hardware, firmware and/or software. Additionally, many of these elements may be implemented as discrete components or in conjunction with other components, in any suitable combination and location.

Figure 1:
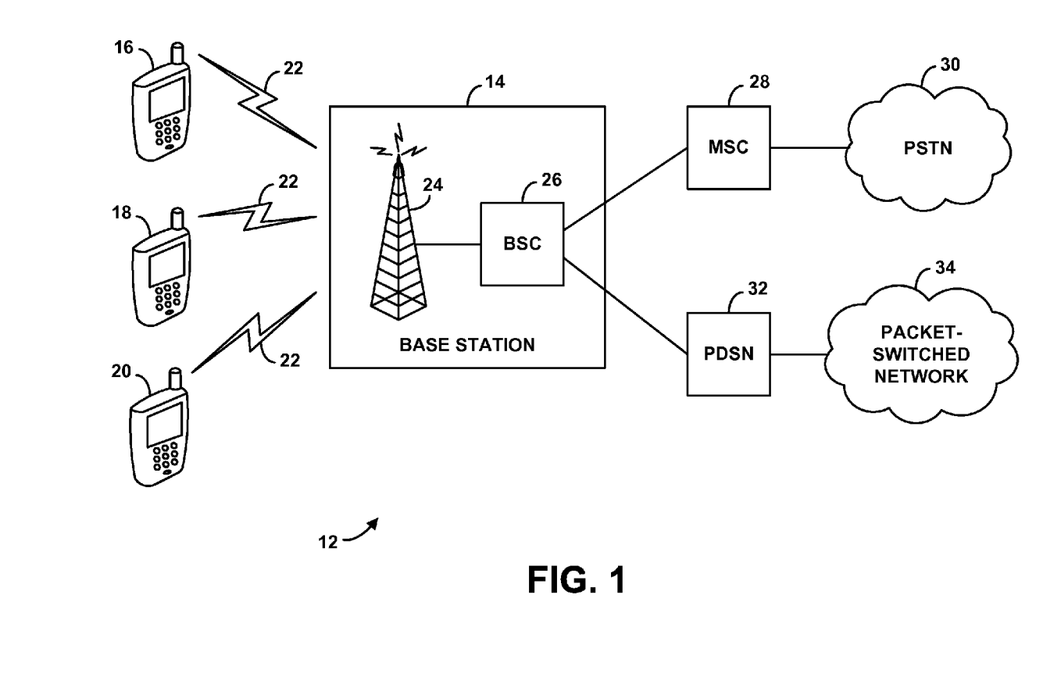
FIG. 1 is a block diagram of a wireless communication system in which an exemplary embodiment of the invention can be implemented.

Referring to the drawings, FIG. 1 is a diagram illustrating a wireless communication system 12 in which the embodiments described in this disclosure may be implemented. System 12 includes at its core a base station 14, which communicates with a plurality of mobile stations 16, 18, 20 over a radio air interface 22. Mobile stations 16, 18, 20 may be cellular phones, wireless personal digital assistants, wireless enabled computers or any other devices capable of wireless communication in system 12. Further, although only three mobile stations are shown, system 12 can serve any number of mobile stations.

As shown, base station 14 includes a base transceiver station (BTS) 24, which communicates with mobile stations 16, 18, 20 using radio-frequency signals over air interface 22. BTS 24 is then couple with a base station controller (BSC) 26, which controls air interface communication and is coupled in turn with one or more switches or gateways that provide connectivity with one or more transport networks. By way of example, BSC 26 may be connected with a mobile switching center (MSC) 28 that provides connectivity with the public switched telephone network (PSTN) 30, and BSC 26 may be connected with a packet data serving node (PDSN) 32 that provides connectivity with a packet-switched network 34 such as the Internet or a wireless carrier's core packet network. With this arrangement, depending on how mobile stations 16, 18, 20 are equipped, mobile stations 16, 18, 20 may be able to engage in communications on PSTN 30 and on packet-switched network 34 in a manner well known to those skilled in the art.

Figure 2:
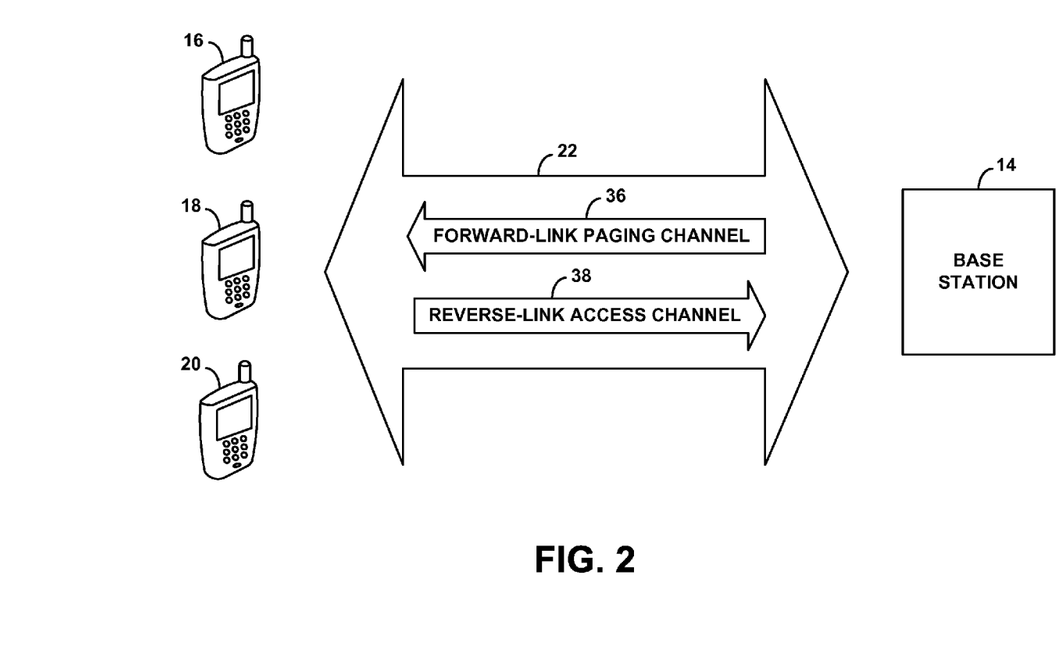
FIG. 2 is a block diagram depicting in more detail the air interface of the communication system of FIG. 1.

FIG. 2 is a diagram illustrating a portion of system 12, with air interface 22 depicted in more detail. As shown by way of example in FIG. 2, air interface 22 includes a forward-link paging channel 36 and a reverse-link access channel 38. The forward-link paging channel 36 carries page messages, the system parameters message noted above, and other control messages from base station 14 to mobile stations 16, 18, 20. The reverse-link access channel 36, on the other hand, carries access probes and other control messages from mobile stations 16, 18, 20 to base station 14. In a CDMA system, each of these channels may be defined by encoding and modulating with a respective Walsh code in a manner well known in the art. Under other protocols, the channels may be defined in other ways, and may have other names.

Figure 3:
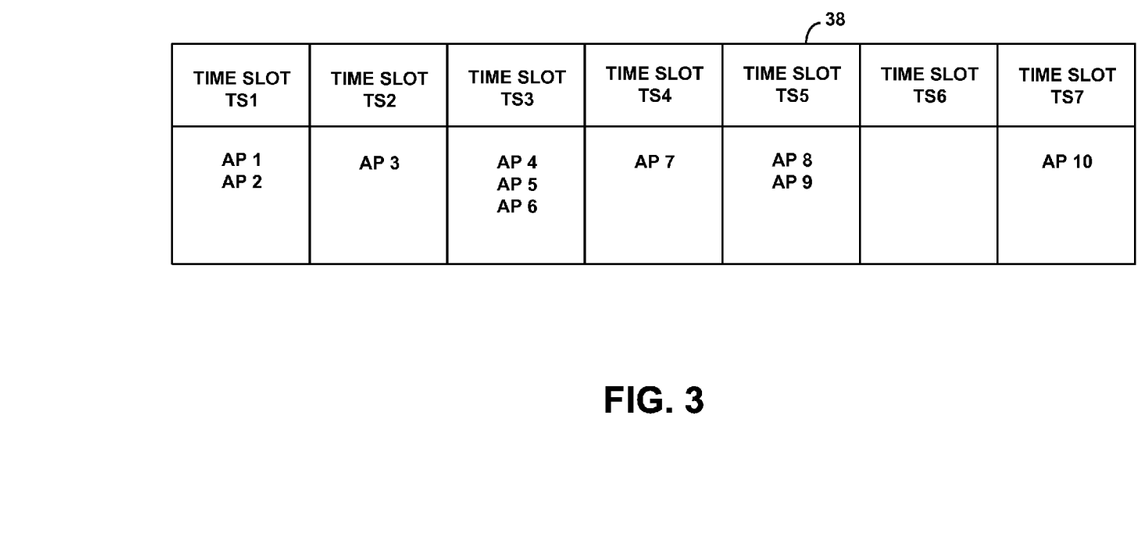
FIG. 3 is a table depicting an example sequence of access channel timeslots and access probes.

FIG. 3 is next a table illustrating how access probes are communicated from mobile stations to a base station in a CDMA system. The table in FIG. 3 shows seven consecutive timeslots in the reverse-link access channel 38 of the air interface 22 of FIGS. 1 and 2. The table in FIG. 3 represents the timeslots of access channel 38 for a particular sector in a wireless communications system. These timeslots are designated TS1 through TS7. In each timeslot, access probes that are communicated by the mobile stations operating in this particular sector are shown in a respective column. FIG. 3 depicts ten example access probes, designated AP1 through AP10.

As explained above, access probe transmission failures can occur for various reasons, the two principal reasons being (i) access probe collisions and (ii) insufficient access probe power and/or excessive reverse link noise.

With the situation illustrated in FIG. 3, for instance, access probe collisions would likely occur in timeslots TS1, TS3 and TS5, because more than one access probe is being sent to the base station 14 in each of those timeslots. When access probes collide, the base station would not successfully receive the access probes, and new access probes would have to be sent. If a large number of mobile stations are attempting to register in the particular sector (e.g., in response to a reg zone directive, periodically registering in accordance with the regperiod directive, or registering as part of the process of placing or receiving a call), the number of timeslots that experience access probe collisions may increase and, consequently the number of retries being attempted and associated access probe collisions will continue to grow.

Further, if a mobile station transmits an access probe at a low power level compared with the level of noise present on the reverse link, the base station 14 may be unable to receive the access probe, which can similarly result in a need to re-transmit. Reverse-link noise (e.g., total power received by BTS 24) may grow for various reasons, such as an increase in traffic in the sector (e.g., during rush hour or lunchtime on weekdays) for instance. When reverse link noise grows sufficiently, access probe transmissions may begin to fail, even for an access probes that the only one in a given slot, i.e., even if no access probe collision occurs, such as in timeslot TS4 for instance.

As a general matter, reverse-link noise can be characterized over a period of time in terms of "reverse noise rise", which is the difference between (i) the reverse-link noise when the sector is most busy (i.e., when the most traffic is flowing through the sector) and (ii) the reverse-link noise when the sector is least busy (i.e., when the least traffic is flowing through the sector). Reverse noise rise is thereby a normalized measure of reverse-link noise, accounting for the noise floor that is generally present in the sector. Reverse noise rise can also be computed specifically for any given time, by comparing the current level of reverse link noise with the reverse link noise floor or with some other designated baseline.

Figure 4:
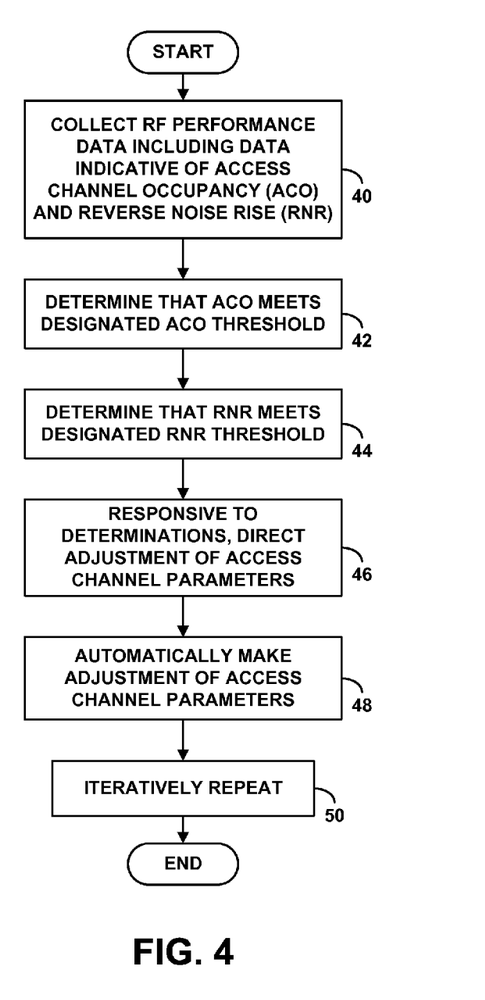
FIG. 4 is a flow chart depicting functions carried out in accordance with an exemplary embodiment of the invention.

FIG. 4 is next a flow chart depicting functions carried out in accordance with the exemplary embodiment. As shown in FIG. 4, at block 40, a computer system will collect data regarding RF performance in a given sector (or other wireless coverage area), including (i) data that indicates access channel occupancy (ACO) in the sector and (ii) data that indicates reverse noise rise (RNR) in the sector. At block 42, the computer system will then compare the sector's ACO to a first threshold and determine that the ACO meets the first threshold. And at block 44, the computer system will compare the sector's RNR to a second threshold and determine that the RNR meets the second threshold. (In practice, the computer system can concurrently perform both of these comparisons, i.e., determining at once that the sector's ACO meets the first threshold and that the sector's RNR meets the second threshold.)

At block 46, in response to the determinations that the sector's ACO meets the first threshold and the sector's RNR meets the second threshold, the computer system will direct one or more adjustments to be made to the sector's access channel parameters. In a preferred embodiment, at block 48, those access channel parameter adjustments will then be automatically made. (In practice, functional blocks 46 and 48 can be combined into one function of adjusting the access channel parameters.) Further, at block 50, the computer system will then iteratively repeat at least a portion of the process until a designated stop condition (e.g., a degradation in RF performance) occurs.

As noted, this process is preferably carried out by a computer system. Most preferably, the computer system is integrated with the base station 22 or comprises the base station 22 itself. However, the computer system may alternatively include other elements (such as MSC 28 or PDSN 32 for instance) or may take other forms and be located elsewhere. For instance, the computer system may comprise one or more computer servers residing on the wireless carrier's core packet network. Other arrangements are possible as well.

Figure 5:
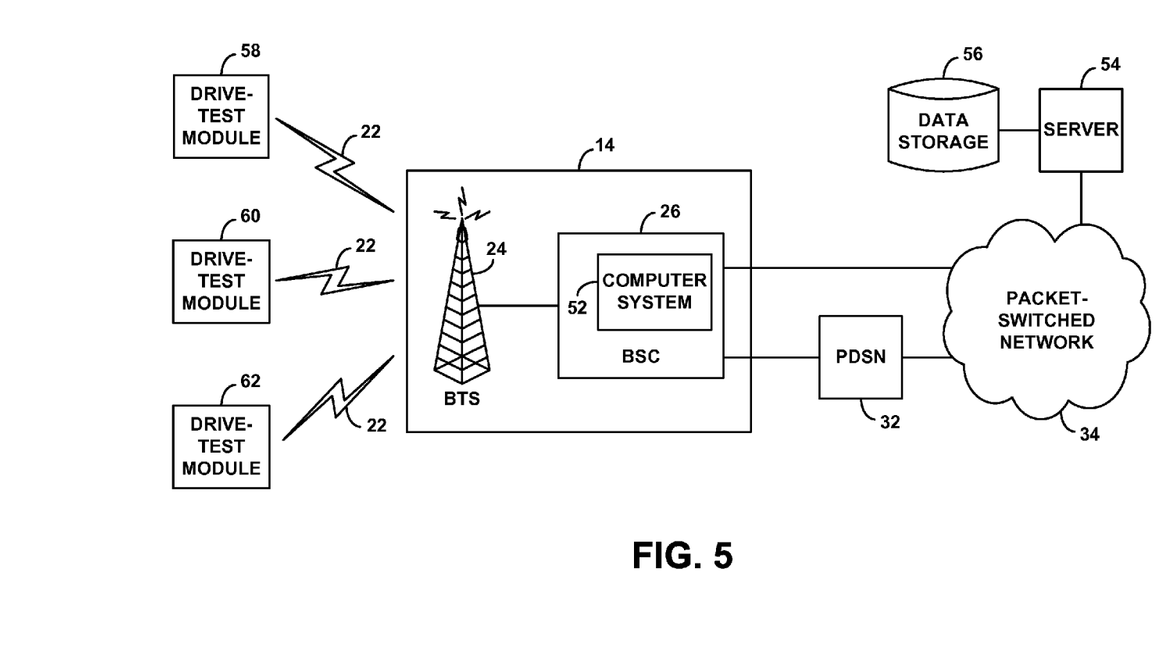
FIG. 5 is a block diagram of a wireless communication system arranged to implement the exemplary embodiment.

FIG. 5 is a block diagram illustrating by way of example how the wireless communication system 12 of FIG. 1 can be adapted to implement the present invention. In this arrangement, the computer system is shown as a function of base station 22 and particularly as a function 52 of BSC 26. In addition, BSC 26 is shown connected as an IP node on packet-switched network 34, so that BSC 26 can itself engage in useful packet-data communications with other elements on network 34.

Shown sitting as another node on network 34, is a network server 54, which includes or is interconnected with a data-storage medium 56 for holding and reporting certain RF performance data, such as drive-test data. In addition, shown in place of (or in addition to) mobile stations 16, 18, 20 are drive-test modules 58, 60, 62, which are arranged and programmed in a manner well known in the art to be able to collect designated RF performance data and to report the collected data via a wireless packet-data connection (namely, via base station 14, PDSN 32, and network 34). In the exemplary embodiment, each drive-test module is programmed to report its collected RF performance data to server 54 (e.g., at a predefined network address), and server 54 is programmed to store the data in data-storage medium 56. Programmable and wirelessly-equipped drive-test modules suitable for this purpose are available from companies such as Agilent Technologies and Willtech International, among others.

Figure 6:
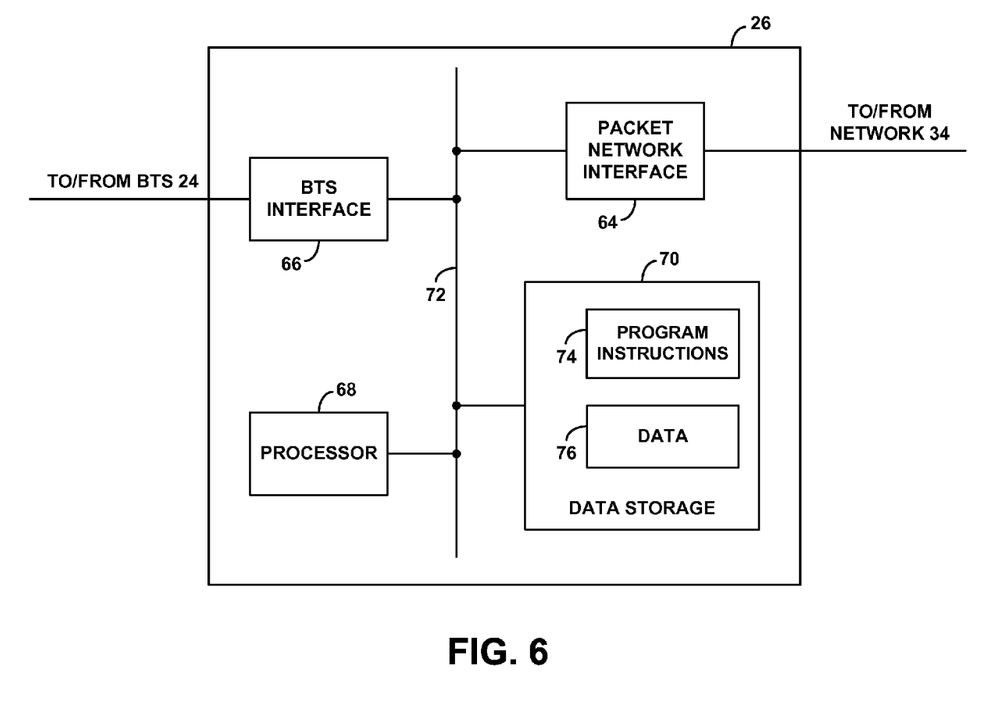
FIG. 6 is a block diagram of a base station controller, depicting functional components for carrying out the exemplary embodiment.

FIG. 6 is a more detailed block diagram of BSC 26, depicting some of the functional components that the BSC would preferably include in order to carry out the functions shown in FIG. 4. As shown by way of example in FIG. 6, BSC 26 includes a packet-network interface 64, a BTS interface 66, a processor 68, and data storage 70, all of which are communicatively linked together by a system bus, network, or other mechanism 72.

Packet-network interface 64 provides for connection with a packet-switched network 34, so that BSC 26 can communicate with one or more entities on network 34, such as computer server 54. In a preferred embodiment, for instance, BSC 26 will receive from server 54 some or all of the RF performance data that server 54 receives from drive test modules, so that BSC 26 can use that drive test data when carrying out further aspects of the inventive process. Packet-network interface 64 may comprise an Ethernet network interface module for instance.

BTS interface 66 provides for connection with BTS 24, for purposes of sending the system parameters message to mobile stations, for engaging in other control communication with mobile stations, and for conveying voice and data between mobile stations and one or more transport networks. Although not shown, BSC 26 may of course further include interfaces for communicating with MSC 28 and PDSN 32.

Processor 68 comprises one or more general-purpose processors (e.g., INTEL microprocessors) and/or one or more special-purpose processors (e.g., discrete digital signal processing units or other logic circuits). Data storage 70 in turn comprises volatile and/or non-volatile storage components, such as optical, magnetic or other memory or disc storage, which can be integrated in whole or in part with processor 68. As shown, data storage 70 contains program instructions 74 that are executable by processor 68 to carry out various functions described herein. (Processor 68 may outsource some functions as well.) Further, in use, data storage 70 includes data 76 that is the subject of the present process, such as RF performance data, access channel parameters, access channel use-statistics, and so forth.

The following sections now address in more detail the functions depicted generally in the flow chart of FIG. 3. As noted above, this implementation is described by way of example only, and variations are possible. For instance, although the description refers to the implementation in terms of IS-856 and IS-2000, the implementation could be applied by analogy with respect to one or more air interface protocols.

Collection of RF Performance Data

In the preferred embodiment, BSC 26 will collect RF performance data on a per-sector (e.g., per sector-carrier) basis and will automatically use that data as a basis to determine what adjustments to make to access channel parameters in the sector, in an effort to improve RF performance. One source of the data that BSC 26 collects may be radio access network (RAN) infrastructure data, such as base station (e.g., BTS and/or BSC) records for instance. Another source of the data may be drive-testing, in which drive-test modules are transported throughout the market area at issue to record and report various RF conditions per time and geographic point or sector.

The RAN infrastructure data for a given sector will preferably include indications of RNR and ACO for the sector or will include data that can be interpreted to indicate RNR and ACO for the sector.

In practice, for instance, the RAN infrastructure data may include log data indicates over time (e.g., at periodic intervals during the past 24 hours) the base station's received signal strength and the amount of traffic (e.g. in Erlangs) in the sector. Based on that data, the BSC 26 may then readily determine (i) a noise floor for the sector, as the reverse-link noise (total received power) when the sector was least busy and (ii) a measure of RNR for the sector, as an average, peak, or other statistical measure of the extent to which reverse-link noise has exceeded the noise floor in the sector.

Further, in practice, the RAN infrastructure data may include log data that indicates over time (e.g., every minute or every five minutes) the number or percentage of access channel timeslots that are being used. (In practice, the an access channel timeslot can be considered to be occupied if it contains energy that is sufficient to be an access probe, even if the timeslot does not actually contain a CRC-verifiable access probe. Alternatively, other rules can be applied to determine if a given timeslot is occupied.) The BSC may use this number, percentage, or some other measure at a given instant, or statistically combined (e.g., averaged) over a designated time period, as the measure of the sector's access channel occupancy.

In addition, the RAN infrastructure data can include a record of the extent to which mobile stations in the sector have experienced access failures, which the BSC can later use as a basis to determine whether to continue iteratively adjusting access channel parameters (as will be described more below). In normal practice, a base station records or "pegs" the occurrence of an access failure when the base station successfully receives an access probe from a mobile station, sends an air interface traffic channel assignment to the mobile station, and then does not detect any communication from the mobile station (e.g., an ACK) through the assigned traffic channel.

As noted, the BSC may collect additional RF performance data from drive-testing, in which drive-test modules are transported throughout the market area at issue to record and report various RF conditions per time and geographic point. Another source of this data may be radio access network (RAN) infrastructure data, such as base station (e.g., BTS and/or BSC) records for instance.

In a manner well known in the art, drive-test modules (such as modules 58, 60, 62 depicted in FIG. 5) can be mounted in courier vehicles that travel throughout the market area or can be transported more manually by technicians moving throughout the area. Further, the modules can be wholly automated in that they automatically collect data and automatically report the collected data over a wireless connection (e.g., a wireless packet-data connection) to server 54 (or to a server that makes the data accessible to the computer system 54). Alternatively, the modules can collect and store data, and the data can later be manually transferred over a wireless or cable connection to the server 54. Each data record preferably specifies the sector for which the data was collected (e.g., as a PN-offset of the sector), to facilitate a per-sector analysis.

Server 54 then periodically (or in response to some other designated trigger, such as operator instruction) sends the received drive-test data, or some portion of it, to BSC 26 via packet-switched network 34. This communication can be done incrementally, sending the latest set of data not yet sent. Further, the communication can be done through pushing (without a request from BSC 26) or pulling (at the BSC's request) over IP, using a data transfer protocol such as FTP, HTTP, SIP or the like.

Preferably, the drive test data that BSC 26 collects for a given sector will include (i) the number of access probes that have been required for mobile stations to successfully register, e.g., when seeking to establish (place or receive) calls, (ii) the number of access probe sequences that have been required for mobile stations to successfully register, e.g., when seeking to establish calls, (iii) the number of access failures experienced by mobile stations, and (iv) the call setup time experienced by mobile stations seeking to establish calls. Some or all of these metrics can be collected and stored as a statistical measure, such as an average number over a time period of interest. Further, note that "access failures" from the perspective of drive-test data can be defined as total failure to successfully register, after exhausting the number of allowed slotted-aloha sequences for instance.

ACO and RNR Threshold Comparisons and Access Channel Parameter Adjustments

As noted above, the BSC will next compare both the ACO and RNR of the sector with respective thresholds, to determine whether to make certain adjustments to the sector's access channel parameters. In a preferred embodiment, the BSC will perform this threshold comparison this with respect to RF performance data collected over a past incremental time period, i.e., a particular time period of interest such as the past 24 hours. Further, the BSC will preferably consider both upper and lower (or high and low) thresholds for both ACO and RNR.

In the exemplary embodiment, the BSC will be programmed with these upper and lower thresholds, such as by having the threshold values encoded as part of program logic 74 or stored as reference-data in data storage 70. The thresholds may be user-defined values that are believed to indicate problem levels for the ACO and RNR metrics. Further, the values used for these thresholds will reflect the degree of sensitivity and responsiveness desired. By way of example, a "high" threshold for ACO could be 35%, and a "low" threshold for ACO could be 5 to 10%. And a "high" threshold for RNR could be 8 dB, and a "low" threshold for RNR could be 2 dB. Other examples are possible, so these values should not be taken as limiting.

Preferably, the BSC will be programmed to detect a combined threshold state of ACO and RNR and to responsively adjust one or more access channel parameters. By way of example, the BSC may apply the following table to identify one of the indicated threshold states:

| Access Channel Occupancy | Reverse Noise Rise | Combined Threshold State |
|---|---|---|
| High | High | A |
| Low | Low | B |
| Low | High | C |

The BSC may then make different adjustments in access channel parameters, depending on which threshold state, if any, exists.

In this regard, the process of the BSC adjusting a given access channel parameter can involve outputting a control signal that will in turn trigger the adjustment, whether the adjustment is made manually or automatically. Alternatively or additionally, the process of the BSC adjusting a given access channel parameter can involve actually changing the parameter value, so that the base station will then broadcast the changed value in the system parameters message, for instance.

In the preferred embodiment, for each threshold state, the BSC is preferably programmed to make a sequence of access channel parameter changes, testing system performance after each change in order to determine whether or not to make a next change or, in some cases, whether to undo the previous change.

The following subsections describe preferred changes to access channel parameters, for each of the threshold states listed in the above table. It should be understood, however, that other adjustments, to these or other access channel parameters, could be made instead. Further, where adjustments are specified without an indication of a specific extent of adjustment, it should be understood that the extent of adjustment is user-definable.

a. Threshold State A—High ACO and High RNR

When the ACO is high, the number of access probe collisions tends to increase, and so the number of access failures tends to increase and call setup time tends to increase. Similarly, when RNR is high, access probes are less likely to successfully reach the base station, and so the number of access failures tends to increase and call setup time tends to increase. Since an increased number of access failures and increased call setup time both negatively impact user experience, change is desired.

In this state, the BSC will preferably seek to reduce the ACO, and to commensurately reduce RNR. To do so, the BSC will preferably make the following adjustments in access channel parameters:

(1) Increase PROBE PN RAN. The BSC will increase PROBE PN RAN by a designated increment. As noted above, the PROBE PN RAN value functions to determine how many different chip delays mobile stations might choose (based on their respective ESNs). By increasing PROBE PN RAN, otherwise simultaneous access attempts will likely be spread more over time, thus likely decreasing access probe collisions.

(2) Decrease INIT POWER. The BSC will decrease INIT POWER. By decreasing INIT POWER, the overall amount of noise on the access channel should be reduced, thereby making it more likely that a given access probe will successfully reach the base station.

(3) Decrease POWER STEP. The BSC will decrease the POWER STEP, as long as the total number of probes that mobile stations have had to send in order to establish calls has exceeded some designated number, such as 3. By decreasing the POWER STEP, similar to a decrease in INIT POWER, the overall amount of noise on the access channel should be reduced, thereby increasing the likelihood of successful access probe communication.

(4) Decrease NUMBER OF PROBES. Decrease the number of probes that a mobile station is allowed to send after the first unsuccessful probe in a given slotted aloha sequence, as long as the total number of probes (e.g., on average) that mobile stations have had to send in order to establish calls have exceeded some designated number, such as 2.

In the preferred embodiment, the BSC will make these parameter adjustments one at a time, proceeding to the next adjustment only if the current adjustment does not result in any reduction of ACO or RNR. (I.e., if an adjustment results in a reduction of ACO or RNR, then the BSC would preferably not proceed to the next adjustment. After making each adjustment, the BSC will preferably wait a sufficient (user-defined) period of time in order to collect new data and will then determine the current ACO and RNR for the sector. If neither the ACO nor the RNR has decreased at all, then the computer system will proceed to make the next adjustment.

After making all four of these adjustments, the BSC will then iteratively repeat the process. Further, the BSC will continue to repeat the process, until at any time (between or during an iteration), a stop condition occurs. Four presently preferred stop conditions are: (i) an increase in access failures, (ii) an increase in call setup time, and (iii) a decrease in ACO to below the "high" threshold, and (iv) a decrease in RNR to below the "high" threshold.

In this regard, if the number of access failures increases in the sector, then a reasonable conclusion is that the adjustment just made created more problems than it solved. An example of this could be that decreasing INIT POWER too much prevents access probes from making it successfully to the base station. Similarly, if the call setup time in the sector increases, a reasonable conclusion is that the adjustment just made created more problems than it solved. Using the same example, a for instance, decreasing INIT POWER too much could result in it taking longer to successfully engage in access probe communication. When a stop condition occurs, the BSC may revert to the access channel parameter values in place before the most recent adjustment.

As an example variation on this process, the fourth adjustment noted above could be conditioned on the adjustment resulting in a reduction of the number of access failures in the sector. That is, after decreasing the NUMBER OF PROBES, the BSC can evaluate new data and determine whether the number of access failures has decreased since the last evaluation. If the number of access failures did not decrease, then the BSC may revert to the NUMBER OF PROBES allowed before the adjustment, so as to help avoid increasing the number of access failures in the long run.

b. Threshold State B—Low ACO and Low RNR

When the ACO is low and the RNR is low, there is essentially no problem on the access channel. Nevertheless, in this state, some access probes might not reach the base station because they are at a relatively low power. Thus, in this state, the BSC will preferably adjust one or more access channel parameters in an effort to improve the chances of successful access probe communication and to thus decrease the likelihood of access failures occurring. Two changes that can be made in that effort are (i) increasing the power at which access probes are transmitted and (ii) increasing the number of access probes transmitted.

Thus, in this state, the BSC will preferably make the following adjustments in access channel parameters:

(1) Increase INIT POWER. The BSC will increase INIT POWER, in order to increase the likelihood of successful access probe communication, particularly if increased success is desired in the first and second access probes.

(2) Increase POWER STEP. The BSC will increase the POWER STEP, in order to increase the likelihood of successful access probe communication, particularly if the data reveals that the number of probes that mobile stations have had to send is averaging 2 or more. Increasing the POWER STEP should decrease the number of required probes.

(3) Increase NUMBER OF PROBES and/or MAXIMUM NUMBER OF SEQUENCES. The BSC will increase the number of probes per sequence and/or the maximum number of sequences (particularly if the data reveals that the number of probes that mobile stations have had to send is averaging 2 or more), thereby increasing the number of access probes transmitting and thus increasing the likelihood of successful transmission.

In the preferred embodiment, the BSC will make these parameter adjustments one at a time, proceeding to the next adjustment only if the current adjustment does not result in any reduction in access failures. (I.e., if an adjustment results in a reduction of access failures, then the BSC would not proceed to the next adjustment.) After making each adjustment, the BSC will preferably wait a sufficient (user-defined) period of time in order to collect new data and will then determine the current number of access failures for the sector. If the number of access failures has not decreased at all, then the computer system will proceed to make the next adjustment.

After making all of these adjustments, the BSC will then iteratively repeat the process. Further, the BSC will continue to repeat the process, until at any time (between or during an iteration), a stop condition occurs. Three presently preferred stop conditions for this analysis are: (i) ACO reaching the "high" threshold or some other defined threshold, (ii) RNR reaching the "high" threshold or some other defined threshold, and (iii) access failures dropping to a defined threshold. Once the number of access failures in the sector decreases to a threshold level, the process can be considered a success.

c. Threshold State C—Low ACO and High RNR

When the ACO is low and the RNR is high, access failures are likely to occur more because of the reverse link noise than because of access channel occupancy. In this state, the BSC will make adjustments that are not intended to change access channel occupancy but are nevertheless intended to increase the likelihood of successful access probe communication.

In this state, the BSC will preferably make the following adjustments in access channel parameters:

(1) Increase PROBE PN RAN. The BSC will increase PROBE PN RAN by a designated increment. As described above, by increasing PROBE PN RAN, otherwise simultaneous access attempts will likely be spread more over time, thus likely decreasing access probe collisions and decreasing the likelihood of access failures.

(2) Decrease INIT POWER. The BSC will decrease INIT POWER. By decreasing INIT POWER, as noted above, the overall amount of noise on the access channel should be reduced, thereby making it more likely that a given access probe will successfully reach the base station.

(3) Decrease POWER STEP. The BSC will decrease the POWER STEP, as long as the total number of probes that mobile stations have had to send in order to establish calls has exceeded some designated number, such as 3. By decreasing the POWER STEP, as noted above, the overall amount of noise on the access channel should be reduced, thereby increasing the likelihood of successful access probe communication.

In the preferred embodiment, the BSC will make these parameter adjustments one at a time, proceeding to the next adjustment only if the current adjustment does not result in any reduction of RNR. (I.e., if an adjustment results in a reduction of RNR, then the BSC would not proceed to the next adjustment.) After making each adjustment, the BSC will preferably wait a sufficient (user-defined) period of time in order to collect new data and will then determine the current RNR for the sector. If the RNR has not decreased at all, then the BSC will proceed to make the next adjustment.

After making all four of these adjustments, the BSC will then iteratively repeat the process. Further, the BSC will continue to repeat the process, until at any time (between or during an iteration), a stop condition occurs. Three presently preferred stop conditions for this analysis are: (i) an increase in access failures, (ii) an increase in call setup time, and (iii) a decrease in RNR to below the "high" threshold.

Exemplary embodiments of the present invention have been described above. Those skilled in the art will understand, however, that changes and modifications may be made to these embodiments without departing from the true scope and spirit of the present invention, which is defined by the claims.

We claim:

1. A method comprising:
   determining that access channel occupancy (ACO) in a sector of a wireless communication system meets a first threshold, wherein the ACO comprises occupancy of an access channel defined on a reverse link of the sector, wherein the access channel carries access probes from mobile stations to a base station;
   determining that reverse noise rise (RNR) in the sector of the wireless communication system meets a second threshold; and
   responsive to determining that (i) the ACO meets the first threshold and (ii) the RNR meets the second threshold, a computer system making one or more access channel parameter adjustments for the sector in an effort to decrease occurrence of access failures in the sector, wherein the one or more access channel parameter adjustments comprise one or more adjustments related to access probe transmission.

2. A method comprising:
   collecting radio frequency (RF) performance data for a designated wireless coverage area of a wireless communication system, the RF performance data including at least (i) data that indicates access channel occupancy in the wireless coverage area, wherein the access channel occupancy comprises occupancy of an access channel defined on a reverse link of the wireless coverage area, wherein the access channel carries access probes from mobile stations to a base station, and (ii) data that indicates reverse-link noise in the wireless coverage area;
   determining that the reverse-link noise meets a reverse-link noise threshold and that the access channel occupancy meets an access channel occupancy threshold; and
   responsive to determining that the reverse-link noise meets the reverse-link noise threshold and that the access channel occupancy meets the access channel occupancy threshold, a computer system automatically adjusting one or more access channel parameters for the wireless coverage area in order to change one or more characteristics of mobile station access probe transmission in the wireless coverage area, wherein the one or more access channel parameters comprise one or more parameters related to access probe transmission.

3. The method of claim 2, further comprising determining a level of reverse noise rise based on the reverse-link noise,
   wherein determining that the reverse-link noise meets the reverse-link noise threshold comprises determining that the reverse noise rise meets a reverse noise rise threshold.

4. The method of claim 2,
   wherein determining that the reverse-link noise meets a reverse-link noise threshold comprises comparing reverse-link noise with both upper and lower reverse-link noise thresholds; and
   wherein determining that the access channel occupancy meets the access channel occupancy threshold comprises comparing the access channel occupancy with both upper and lower access channel occupancy thresholds.

5. The method of claim 2, wherein automatically adjusting one or more access channel parameters for the wireless coverage area comprises:
   making a sequence of adjustments to the access channel parameters; and
   conditioning each adjustment of the sequence on a stop condition not existing.

6. The method of claim 5, further comprising:
   iteratively repeating the method.

7. In a wireless communication system, a computer system comprising:
   a processor;
   data storage;
   program logic stored in the data storage and executable by the processor to perform functions comprising:
      determining that access channel occupancy (ACO) in a sector of the wireless communication system meets a first threshold, wherein the ACO comprises occupancy of an access channel defined on a reverse link of the sector, wherein the access channel carries access probes from mobile stations to a base station;
      determining that reverse noise rise (RNR) in the sector of the wireless communication system meets a second threshold; and
      responsive to determining that (i) the ACO meets the first threshold and (ii) the RNR meets the second threshold, determining that one or more access channel parameter adjustments should be made for the sector in an effort to decrease occurrence of access failures in the sector, wherein the one or more access channel parameter adjustments comprise one or more adjustments related to access probe transmission.

8. The computer system of claim 7, integrated in a base station of the wireless communication system.

9. In a wireless communication system, a computer system comprising:
   a processor;
   data storage;
   program logic stored in the data storage and executable by the processor to perform functions comprising:
      determining that access channel occupancy (ACO) in a sector of the wireless communication system meets a first threshold;
      determining that reverse noise rise (RNR) in the sector of the wireless communication system meets a second threshold; and
      responsive to determining that (i) the ACO meets the first threshold and (ii) the RNR meets the second threshold, determining that one or more access channel parameter adjustments should be made for the sector in an effort to decrease occurrence of access failures in the sector,
   wherein the first threshold is a designated "high" level of ACO, wherein the second threshold is a designated "high" level of RNR, and wherein the one or more access channel parameter adjustments comprise an adjustment selected from the group consisting of:
   (a) increasing randomness of access probe transmission over time;
   (b) decreasing initial power for access probe transmission;
   (c) decreasing power steps between access probe transmissions; and
   (d) decreasing maximum number of access probes that a mobile station is allowed to transmit per access probe sequence.

10. The computer system of claim 9, wherein the program logic is further executable by the processor to sequentially make adjustments (a) through (d) until a given adjustment results in reduction in the ACO or RNR.

11. The computer system of claim 10, wherein the program logic is executable by the processor to iteratively repeat the sequentially making of adjustments (a) through (d) unless a stop condition selected from the group consisting of the following conditions occurs:

(i) number of access failures in the sector increases;
(ii) call setup time in the sector increases;
(iii) the ACO decreases to below the designated "high" level; and
(iv) the RNR decreases to below the designated "high" level.

12. The computer system of claim 11, wherein the program logic is executable by the processor to, after occurrence of at least one of the stop conditions:
reevaluate the ACO and RNR in the sector to determine whether the ACO and RNR meet designated thresholds; and
upon determining that the ACO and RNR meet designated thresholds, again make one or more access parameter adjustments for the sector.

13. In a wireless communication system, a computer system comprising:
a processor;
data storage;
program logic stored in the data storage and executable by the processor to perform functions comprising:
determining that access channel occupancy (ACO) in a sector of the wireless communication system meets a first threshold;
determining that reverse noise rise (RNR) in the sector of the wireless communication system meets a second threshold; and
responsive to determining that (i) the ACO meets the first threshold and (ii) the RNR meets the second threshold, determining that one or more access channel parameter adjustments should be made for the sector in an effort to decrease occurrence of access failures in the sector,
wherein the first threshold is a designated "low" level of ACO, wherein the second threshold is a designated "low" level of RNR, and wherein the one or more access channel parameter adjustments comprise an adjustment selected from the group consisting of:
(a) increasing initial power for access probe transmission;
(b) increasing power steps between access probe transmissions;
(c) increasing maximum number of access probes that a mobile station is allowed to transmit per access probe sequence; and
(d) increasing maximum number of access probe sequences in which a mobile station is allowed to engage when establishing a call.

14. The computer system of claim 13, wherein the program logic is further executable by the processor to sequentially make adjustments (a) through (d) until a given adjustment results in reduction of number of access failures in the sector.

15. The computer system of claim 14, wherein the program logic is executable by the processor to iteratively repeat the sequentially making of adjustments (a) through (d) unless a stop condition selected from the group consisting of the following conditions occurs:
(i) the ACO increases to a designated "high" ACO level;
(ii) the RNR increases to a designated "high" RNR level; and
(iii) number of access failures in the sector decreases to a designated access failure threshold.

16. The computer system of claim 15, wherein the program logic is executable by the processor to, after occurrence of at least one of the stop conditions:
reevaluate the ACO and RNR in the sector to determine whether the ACO and RNR meet designated thresholds; and
upon determining that the ACO and RNR meet designated thresholds, again make one or more access parameter adjustments for the sector.

17. In a wireless communication system, a computer system comprising:
a processor;
data storage;
program logic stored in the data storage and executable by the processor to perform functions comprising:
determining that access channel occupancy (ACO) in a sector of the wireless communication system meets a first threshold;
determining that reverse noise rise (RNR) in the sector of the wireless communication system meets a second threshold; and
responsive to determining that (i) the ACO meets the first threshold and (ii) the RNR meets the second threshold, determining that one or more access channel parameter adjustments should be made for the sector in an effort to decrease occurrence of access failures in the sector,
wherein the first threshold is a designated "low" level of ACO, wherein the second threshold is a designated "high" level of RNR, and wherein the one or more access channel parameter adjustments comprise an adjustment selected from the group consisting of:
(a) increasing randomness of access probe transmission over time;
(b) decreasing initial power for access probe transmission; and
(c) decreasing power steps between access probe transmissions.

18. The computer system of claim 17, wherein the program logic is further executable by the processor to sequentially make adjustments (a) through (c) until a given adjustment results in reduction in the RNR.

19. The computer system of claim 18, wherein the program logic is executable by the processor to iteratively repeat the sequentially making of adjustments (a) through (c) unless a stop condition selected from the group consisting of the following conditions occurs:
(i) number of access failures in the sector increases;
(ii) call setup time in the sector increases; and
(iii) the RNR decreases to below the designated "high" level.

20. The computer system of claim 19, wherein the program logic is further executable to, after occurrence of at least one of the stop conditions:
reevaluate the ACO and RNR in the sector to determine whether the ACO and RNR meet designated thresholds; and
upon determining that the ACO and RNR meet designated thresholds, again make one or more access parameter adjustments for the sector.

\* \* \* \* \*